United States Patent [19]

Kalata

[11] Patent Number: 4,775,949
[45] Date of Patent: Oct. 4, 1988

[54] WEIGH FEEDING SYSTEM WITH STOCHASTIC CONTROL

[75] Inventor: Paul R. Kalata, Cherry Hill, N.J.

[73] Assignee: K-Tron International, Inc., Pitman, N.J.

[21] Appl. No.: 879,430

[22] Filed: Jun. 27, 1986

[51] Int. Cl.$^4$ .................... G01G 13/00; B67D 5/14
[52] U.S. Cl. .................................. 364/567; 177/59; 177/66; 222/56
[58] Field of Search ............... 364/510, 567, 568, 465, 364/466; 177/59, 60, 63, 64, 66, 71, 114, 119, 121-123; 340/673; 222/1, 56, 58, 59

[56] References Cited

U.S. PATENT DOCUMENTS

| Re. 32,101 | 4/1986 | Ricciardi et al. | 222/56 |
|---|---|---|---|
| 3,116,801 | 1/1964 | Bauder et al. | 177/1 |
| 3,463,979 | 8/1969 | Scobie et al. | 318/565 |
| 3,481,509 | 12/1969 | Marhauer | 222/1 |
| 3,622,767 | 11/1971 | Koepcke | 235/150.1 |
| 3,633,009 | 1/1972 | Green et al. | 235/151.3 |
| 3,700,490 | 10/1972 | Hiyosi et al. | 427/10 |
| 3,767,900 | 10/1973 | Chao et al. | 235/150.1 |
| 3,845,370 | 10/1974 | Mantey | 318/327 |
| 3,876,871 | 4/1975 | Sinner | 364/106 |
| 3,889,848 | 6/1975 | Ricciardi et al. | 222/58 |
| 4,167,576 | 4/1980 | Sanchez | 235/150.1 |
| 4,301,510 | 11/1981 | Ricciardi et al. | 364/567 |
| 4,524,886 | 6/1985 | Wilson et al. | 222/58 |
| 4,528,918 | 7/1985 | Sato et al. | 110/347 |
| 4,534,428 | 8/1985 | Mosher et al. | 177/64 |
| 4,545,242 | 10/1985 | Chan | 73/152 |
| 4,552,235 | 11/1985 | Brunnschweiler | 177/59 |
| 4,577,270 | 3/1986 | Sugano et al. | 364/151 |

FOREIGN PATENT DOCUMENTS 1255541 12/1971 United Kingdom .

OTHER PUBLICATIONS

Paul R. Kalata, "The Tracking Index: A Generalized Parameter for $\alpha-\beta$ and $\alpha-\beta-\gamma$ Target Trackers", IEEE Transactions on Aerospace and Electronic Systems, vol. AES-20, No. 2, Mar. 1984, pp. 174-182.

T. J. Williams et al., "Progress in Direct Digital Control", Instrument Society of America, Pittsburgh, 1969, pp. 53, 69, 92, 93, 255.

Emanuel S. Savas, Ph.D., "Computer Control of Industrial Processes", 1965, pp. 12-15.

J. S. Meditch, "Stochastic Optimal Linear Estimation and Control", Boeing Scientific Research Laboratories, pp. 1-394, 1969.

Andrew P. Sage, et al., "Optimum Systems Control" Second Edition, 1977, pp. 1-413.

Andrew P. Sage, et al., "Estimation Theory with Applications to Communications and Control", 1971, pp. 1-529.

Robert F. Stengel, "Stochastic Optimal Control", Theory and Application, 1986, pp. 1-638.

Stanley M. Shinners, "Control System Design", 1964, pp. 1-523.

Primary Examiner—Parshotam S. Lall
Assistant Examiner—Brian M. Mattson
Attorney, Agent, or Firm—Parkhurst & Oliff

[57] ABSTRACT

A weigh feeding system using a stochastic controller wherein the weight of material is sensed, and an estimate of the mass flow state of the material being discharged is created by use of a Kalman filter process. Plant noise processes and measurement noise processes, which affect the measured weight signal, are modeled as stochastic processes and are used, in combination with the sensed weight signal, to calculate the estimated mass flow state. The noise model is modified to account for severe disturbances. The estimated mass flow state signal is used to calculate a motor feedback signal which, in turn, is used to control the speed of the discharge apparatus. In this manner, the mass flow of the material actually being discharged is driven to a desired mass flow with minimum error variance in the presence of unavoidable plant and measurement noise.

10 Claims, 11 Drawing Sheets

Motor Signal $I_M$

Estimated Mass Flow $\hat{W}_r$ (PPM/t)

Time Period T (SEC)

Cycles

| Cycle | Mass Flow Estimate $\hat{W}_r$ | Motor Signal $I_M$ | Cycle | Mass Flow Estimate $\hat{W}_r$ | Motor Signal $I_M$ |
|---|---|---|---|---|---|
| 1 | 7.3273 | 0 | 52 | -510.33 | -1358 |
| 2 | 0.12521 | -634 | 53 | -508.7 | -1348 |
| 3 | -9.5743 | -1273 | 54 | -501.11 | -1351 |
| 4 | -208.94 | -1545 | 55 | -497.76 | -1353 |
| 5 | -301.31 | -1744 | 56 | -493.46 | -1363 |
| 6 | -393.89 | -1824 | 57 | -488.2 | -1378 |
| 7 | -489.45 | -1803 | 58 | -453.92 | -1448 |
| 8 | -551.21 | -1728 | 59 | -456.82 | -1486 |
| 9 | -583.78 | -1625 | 60 | -490.87 | -1483 |
| 10 | -604 | -1501 | 61 | -525.61 | -1441 |
| 11 | -604.39 | -1387 | 62 | -530.04 | -1411 |
| 12 | -578.79 | -1311 | 63 | -518.83 | -1395 |
| 13 | -540.2 | -1281 | 64 | -527.2 | -1357 |
| 14 | -514.73 | -1271 | 65 | -518.24 | -1345 |
| 15 | -491.44 | -1290 | 66 | -503.2 | -1346 |
| 16 | -477.72 | -1318 | 67 | -499.45 | -1346 |
| 17 | -473.65 | -1348 | 68 | -491.93 | -1359 |
| 18 | -466.81 | -1389 | 69 | -496.28 | -1359 |
| 19 | -470.44 | -1419 | 70 | -502.23 | -1356 |
| 20 | -491.62 | -1418 | 71 | -514.69 | -1333 |
| 21 | -508.46 | -1404 | 72 | -507.06 | -1332 |
| 22 | -511.78 | -1391 | 73 | -491.18 | -1347 |
| 23 | -510.18 | -1381 | 74 | -484.23 | -1366 |
| 24 | -506.19 | -1376 | 75 | -489.15 | -1375 |
| 25 | -500.06 | -1378 | 76 | -487.95 | -1391 |
| 26 | -499.19 | -1378 | 77 | -490.13 | -1400 |
| 27 | -507.11 | -1366 | 78 | -498.05 | -1399 |
| 28 | -480.12 | -1405 | 79 | -492.47 | -1412 |
| 29 | -460.06 | -1453 | 80 | -499.33 | -1406 |
| 30 | -472.58 | -1475 | 81 | -511.81 | -1389 |
| 31 | -513.86 | -1441 | 82 | -516.73 | -1370 |
| 32 | -532.57 | -1404 | 83 | -512.66 | -1358 |
| 33 | -525.7 | -1379 | 84 | -504.37 | -1356 |
| 34 | -517.18 | -1362 | 85 | -488.67 | -1376 |
| 35 | -501.41 | -1368 | 86 | -492.29 | -1379 |
| 36 | -492.74 | -1377 | 87 | -501.31 | -1376 |
| 37 | -494.22 | -1382 | 88 | -500.11 | -1377 |
| 38 | -516.09 | -1353 | 89 | -492.17 | -1389 |
| 39 | -531.49 | -1315 | 90 | -492.37 | -1396 |
| 40 | -552.66 | -1246 | 91 | -489.18 | -1411 |
| 41 | -535.69 | -1220 | 92 | -500.01 | -1404 |
| 42 | -491.65 | -1246 | 93 | -517.3 | -1378 |
| 43 | -468.44 | -1286 | 94 | -510.77 | -1373 |
| 44 | -457.92 | -1337 | 95 | -496.47 | -1381 |
| 45 | -457.12 | -1384 | 96 | -496.55 | -1383 |
| 46 | -456.07 | -1434 | 97 | -501.36 | -1380 |
| 47 | -469.26 | -1461 | 98 | -504.18 | -1374 |
| 48 | -494.12 | -1458 | 99 | -504.31 | -1370 |
| 49 | -520.7 | -1425 | 100 | -500.53 | -1371 |
| 50 | -534.91 | -1383 | 101 | -496.19 | -1377 |
| 51 | -520.95 | -1368 | 102 | -492.92 | -1386 |

Fig. 7

WEIGH FEEDING SYSTEM WITH STOCHASTIC CONTROL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise serves all copyright rights whatsoever.

This invention pertains to weigh feeding systems.

The present invention uses a Kalman filtering process to develop filtered estimates of the actual weight state and the mass flow state. These filtered estimates are used, in combination with modeling and classification of the plant and measurement noise processes which affect the weight measurements, to control the actual mass flow state. The class of noise is determined, and a stochastic model for each class is created. The estimated mass flow signal is produced based on the measured weight and the stochastic models of the individual noise processes affecting the system. The noise process models are modified according to the magnitude of their effects and probability of occurrence.

The estimated mass flow state signal is then compared with a desired mass flow set-point, and the resultant error signal is used to control a discharge actuator to produce the desired mass flow.

BRIEF DESCRIPTION OF THE DRAWINGS

FIG. 7 is a tabular representation of the graphs of FIGS. 6D and 6E.

DESCRIPTION OF THE PREFERRED EMBODIMENT

In the present weigh feeding system, solid or liquid material stored in a hopper or other container is discharged by a conventional discharge actuator such as a screw feeder, conveyor, pump, valve or the like as appropriate. The discharge actuator is driven by an electric motor. The system also includes a weight sensing device, such as a scale, for sensing the weight of the material in the hopper or the material being discharged, and for producing a signal indicative of the sensed weight state. The signal produced by the weight sensing device is applied to a weight signal processor which, in turn, produces a signal which is an estimate of the weight rate state or mass flow state of material being discharged. The estimate of mass flow state is then used, in a feedback loop, to control the motor to drive the estimated mass flow state to a desired set-point mass flow.

Figure 1:
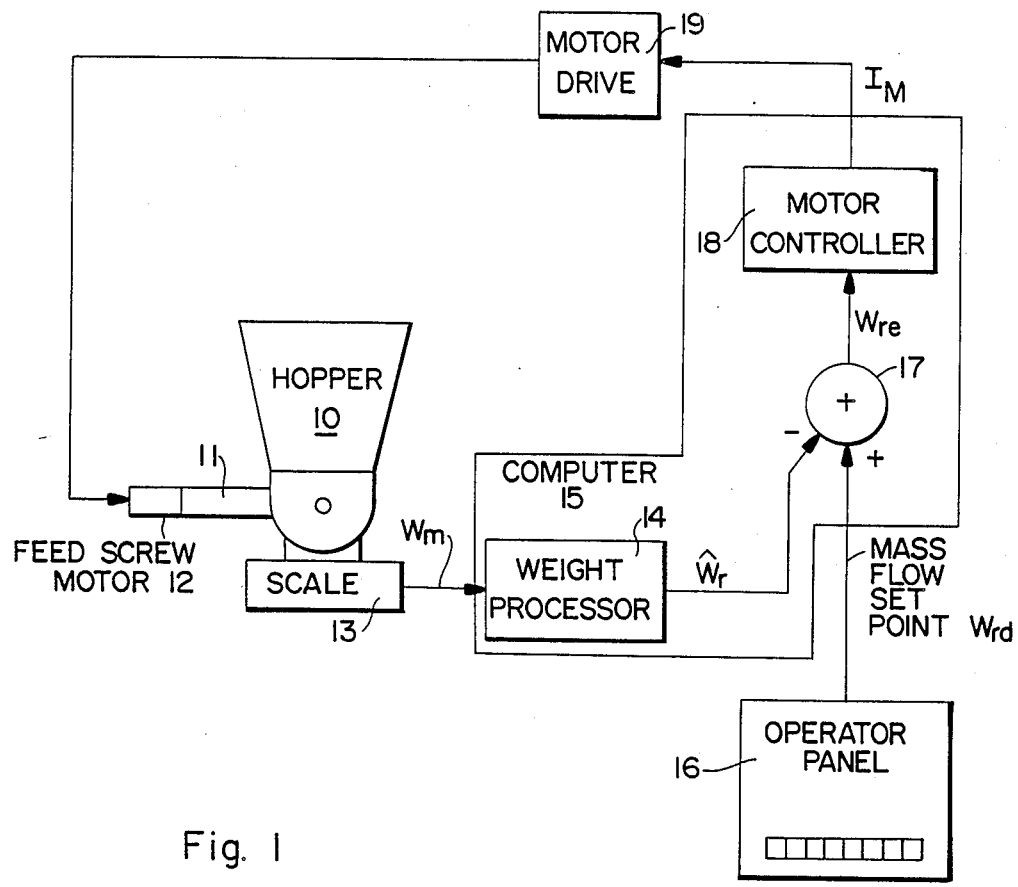
FIG. 1 is a loss-in-weight feeding system embodying the present invention.

Referring to FIG. 1, material stored in hopper 10 is discharged by feed screw 11 driven by feed screw motor 12. Scale 13 measures the combined weight of hopper 10, feed screw 11 and motor 12 to produce a measured weight signal $W_m$. It will be understood that in a conveyer weigh feeder, scale 13 would sense the weight of material being discharged upon at least a portion of the length of the conveyer. Signal $W_m$ is applied to weight signal processor 14 in computer 15 which produces an estimate, $\hat{W}_r$, of the mass flow state of material based upon the measured weight $W_m$. An operator enters a desired mass flow set-point $W_{rd}$ through control panel 16. The estimated mass flow state $\hat{W}_r$ is compared with the desired mass flow $W_{rd}$ by summing junction 17 to produce an error signal state $W_{re}$. The error signal state is used by motor controller 18 to calculate a motor control signal $I_M$ which is applied to motor drive 19. The estimated mass flow state $\hat{W}_r$, and the actual mass flow, are thus driven to the desired set-point $W_{rd}$.

The weight sensor is, of course, subject to random and systematic instrument and phenomenon errors. The sensor produces erroneous results not only because of internal electronic noise, but also because of the physical inertia of the sensor as well as effects of external electronic noise.

In addition, the physical plant including the material hopper, feed screw and motor are also susceptible of disturbance. These plant disturbance processes include: vibrational noise due to the mechanical movement of the feeding screw or material mixer contained within the hopper; varying or non-uniform output feed due to lumpy material or non-uniform screw discharge; refilling of the hopper with material at times and at refill rates that are uncertain; unintentional aperiodic superimposed hopper disturbances such as bumping the feeder, or dropping or lifting extraneous weights such as tools; and periodic and aperiodic disturbances of the hopper due to environmental effects such as wind, neighboring machines or passing vehicles.

In general then, a weight measurement yields only crude information about a loss-in-weight feeding system's behavior and, by itself, may be unsatisfactory for assessing the system's states and ultimately controlling the mass flow.

Figure 2:
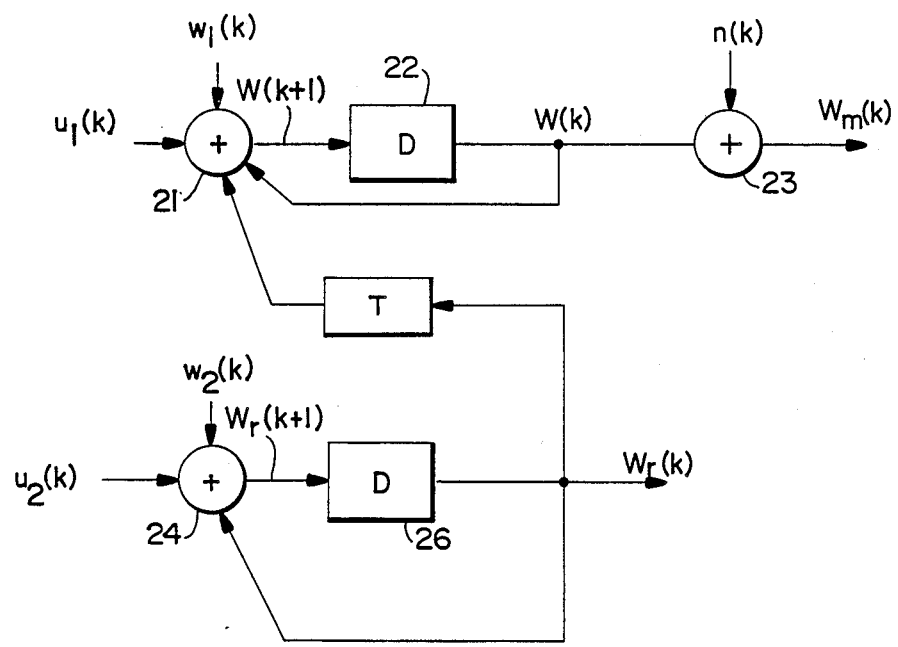
FIG. 2 is a schematic of a model of a discrete-time loss-in-weight system.

The mathematical model of a discrete-time material discharge system is shown in FIG. 2. The actual weight state of material at time $k+1$ is produced by summing junction 21 which provides the sum of the actual weight state at time k, $W(k)$, the plant noise process affecting the weight at time k, $w_1(k)$, the effect of the motor control on the weight, $u_1(k)$, and the actual mass flow state at time k, $W_r(k)$, multiplied by the sampling time T. This multiplication by T represents a time integration of mass flow state, $W_r$. Actual weight state signal $W(k+1)$ is applied to delay block 22 to produce actual weight state signal $W(k)$. The measured weight signal $W_m(k)$ is produced by summing junction 23 which adds measurement noise process $n(k)$ to actual weight state signal $W(k)$.

The actual mass flow state at time $k+1$, $W_r(k+1)$, is produced by summing junction 24 which provides the sum of the actual mass flow state at time k, $W_r(k)$, the effect of the motor control on the mass flow, $u_2(k)$, and the mass flow plant noise process $w_2(k)$. The mass flow state at time k, $W_r(k)$ is produced from the actual mass flow state $W_r(k+1)$ via delay block 26.

The block diagram of FIG. 2 is a schematic representation of the following mathematical equations:

$$W(k+1) = W(k) + TW_r(k) + u_1(k) + w_1(k)$$

$$W_r(k+1) = W_r(k) + u_2(k) + w_2(k)$$

$$W_m(k) = W(k) + n(k)$$

where:
k = 1, 2, 3, ...
$W(k)$ is the actual weight state at time k;
$W_r(k)$ is the actual mass flow state at time k;
$W_m(k)$ is the weight measurement at time k;
T is the time period between samples;
$u_1(k)$ is the effect of the motor control on the actual weight state;
$u_2(k)$ is the effect of the motor control on the actual mass flow state;
$n(k)$ is the measurement noise;
$w_1(k)$ is the plant weight noise perturbation; and
$w_2(k)$ is the plant mass flow noise perturbation.

Weight state W and mass flow state $W_r$ are known as state variables, and the mass flow state is the time derivative of the weight state (i.e., the weight is the integral of the mass flow). The only state variable sensed is the weight W which can only be sensed indirectly from the noise corrupted signal $W_m$. It is to be noted that noise processes n, $w_1$ and $w_2$ are unavoidable and are always present in the system. Controlling, via $u_1$ and $u_2$, the discharge using only measured weight signal $W_m$ in ignorance of the plant and measurement noise processes, will invariably result in an inferior system.

Figure 3:
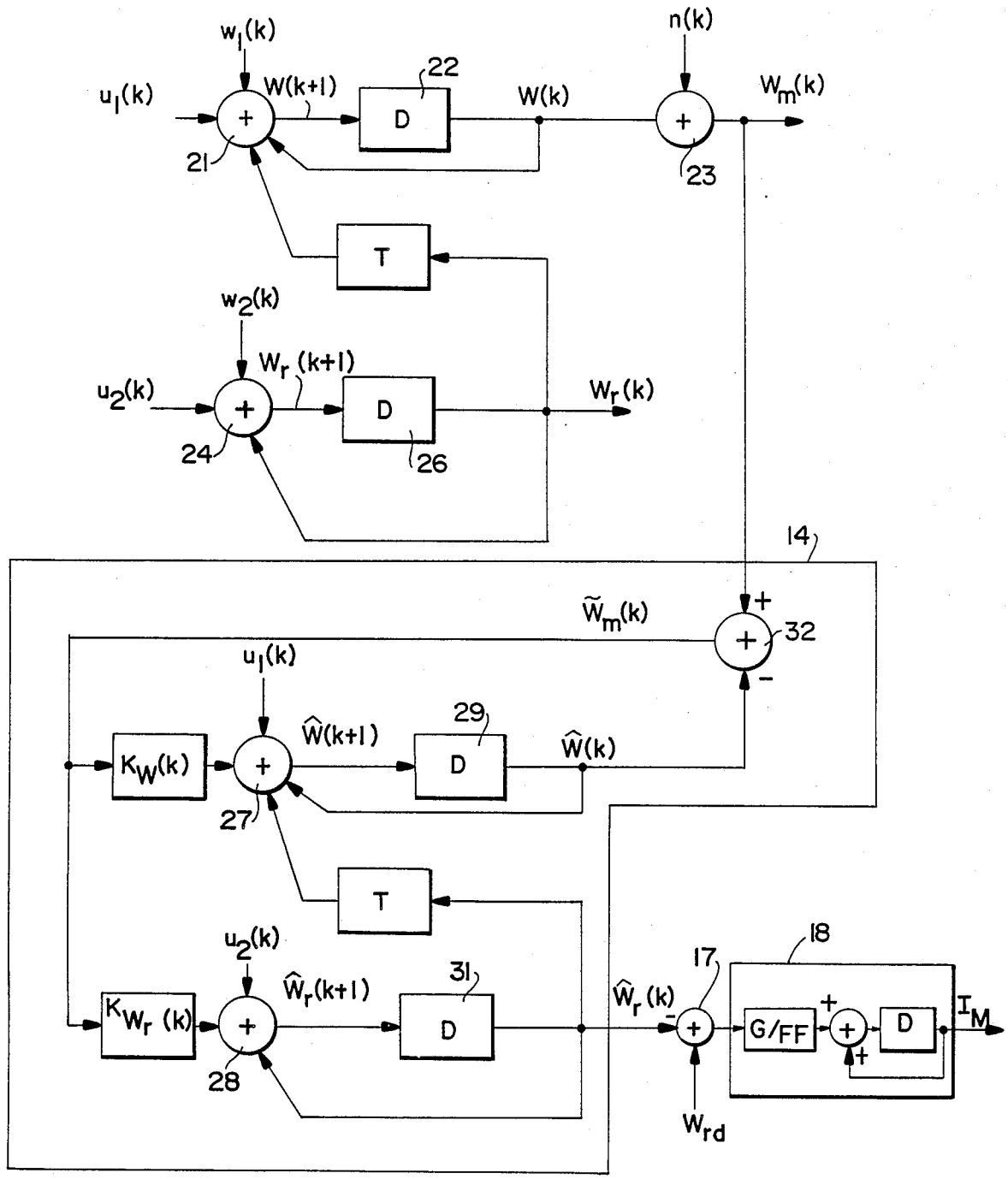
FIG. 3 is a schematic of a model of a discrete-time loss-in-weight system, a Kalman filter to estimate mass flow and a motor control signal processor according to the present invention.

FIG. 3 is a block diagram of a real discrete-time material discharge system connected to a block diagram of a discrete-time weight signal processor and motor controller according to the present invention. Elements identical to those in FIGS. 1 and 2 bear the same numeral identifier. The weight signal processor uses a Kalman filtering process to develop a filtered estimate of the actual weight state $\hat{W}(k)$ and a filtered estimate of the mass flow state $\hat{W}_r(k)$. The estimate of mass flow state $\hat{W}_r(k)$ is used, by motor controller 18, as shown schematically in FIG. 3 and in detail in FIG. 5, to calculate motor control signal $I_M$ and motor controls $u_1(k)$ and $u_2(k)$. Motor controls $u_1(k)$ and $u_2(k)$ are the mathematical affects on actual weight state $W(k)$ and actual mass flow state $W_r(k)$, respectively, and are used in the prediction process of estimated weight state $\hat{W}(k)$ and estimated mass flow state $\hat{W}_r(k)$.

In the lower portion of FIG. 3 is signal processor 14, summing junction 17 and motor controller 18 shown in FIG. 1. The signal processor is configured as a Kalman filter whose structure is identical to the mathematical model of the real system. Summing junctions 27 and 28 perform the function of summing junctions 21 and 24 in the real system. Delay blocks 29 and 31 model the functions of real delay blocks 22 and 26, respectively.

Summing junction 32 provides the difference between measured weight $W_m(k)$ and estimated weight state $\hat{W}(k)$. This difference, $\tilde{W}_m(k)$, also known as the measurement residual, is multiplied by gain $K_w(k)$ and applied to summing junction 27 in calculating the next weight state estimate $\hat{W}(k+1)$. $\tilde{W}_m(k)$ is also multiplied by gain $K_{W_r}(k)$ and applied to summing junction 28 in calculating the next mass flow state estimate $\hat{W}_r(k+1)$. Gains $K_W$ and $K_{W_r}$ are known as the Kalman gains and are variable according to the error covariance of the estimated weight state $\hat{W}$ and estimated mass flow state $\hat{W}_r$ relative to the real values of W and $W_r$, while taking into account noise processes n, $w_1$ and $w_2$. Details of the calculation of Kalman gains $K_W$ and $K_{W_r}$ are presented below referring to FIGS. 4A–4C.

Since the effects of the noise processes n, $w_1$ and $w_2$ are used in the calculation of the Kalman gains, it is important not only to identify the various noise sources and their effect on the state variables W and $W_r$, but also to model their magnitudes and to include the magnitudes into the Kalman gain calculation.

Each noise process is modeled as a zero mean, white process with the following noise covariances:

$$R(k) = \sigma_n^2$$

$$Q(k) = \begin{bmatrix} \sigma_{w1}^2 & \sigma_{w1,w2}^2 \\ \sigma_{w1,w2}^2 & \sigma_{w2}^2 \end{bmatrix}$$

where:
$\sigma^2_n$ is the variance of the measurement noise process;
$\sigma^2_{w1}$ is the variance of the plant noise process affecting the weight;
$\sigma^2_{w2}$ is the variance of the plant noise process affecting the mass flow; and
$\sigma^2_{w1,w2}$ is the covariance of plant noise processes $w_1$ and $w_2$.

As mentioned above, plant noise processes $w_1$ and $w_2$ are the weight noise perturbation and mass flow noise perturbation, respectively. In a practical system, mass flow noise perturbation $w_2$ is a regular noise process due to, for example, lumpy or non-uniform material being fed. Weight noise perturbations $w_1$ is an irregular process due to highly unpredictable sources, such as vibrations from passing vehicles, or physical impact with the material hopper. Measurement noise process n is also a regular noise process due to random and systematic measurement instrument and discharge system phenomenon errors. For example, vibrations from the feed screw or material mixer, in addition to weight sensor inaccuracies, contribute to measurement noise process n.

Variance, $\sigma^2_n$ is determined experimentally or emperically from an actual system. For example, the material discharge system is operated without loss in weight and variance $\sigma^2_n$ is calculated from a series of weight measurements $W_m(k)$. The variance, $\sigma^2_{w2}$, is calculated from machine operational specifications. for example, if the desired mass flow deviation ($\sigma_{Wd}$) is specified, $\sigma_{w2}$ is set proportional to $\sigma_{Wd}$.

In contrast, plant noise process $w_1$, being unpredictable, is modeled as having variance A, where A is determined from the magnitude of the sensed measurement residual. Details of this process and calculation of A are described below with reference to FIG. 4B.

Finally, since the plant noise processes are typically not correlated, $\sigma^w{}_{21, w2}$ is equal to 0.

The plant noise covariance matrix $Q(k)$ is determined in the following manner. First, $Q(k)$ is set equal to $Q_o$, where:

$$Q_0 = \begin{bmatrix} 0 & 0 \\ 0 & \sigma_{w2}^2 \end{bmatrix}$$

Next, A is calculated from the magnitude of the measurement residual and the probability of occurrence of that magnitude of residual. Then Q(k) is replaced by $Q_1$ where:

$$Q_1 = \begin{bmatrix} A & 0 \\ 0 & \sigma_{w2}^2 \end{bmatrix}$$

Figure 4A:
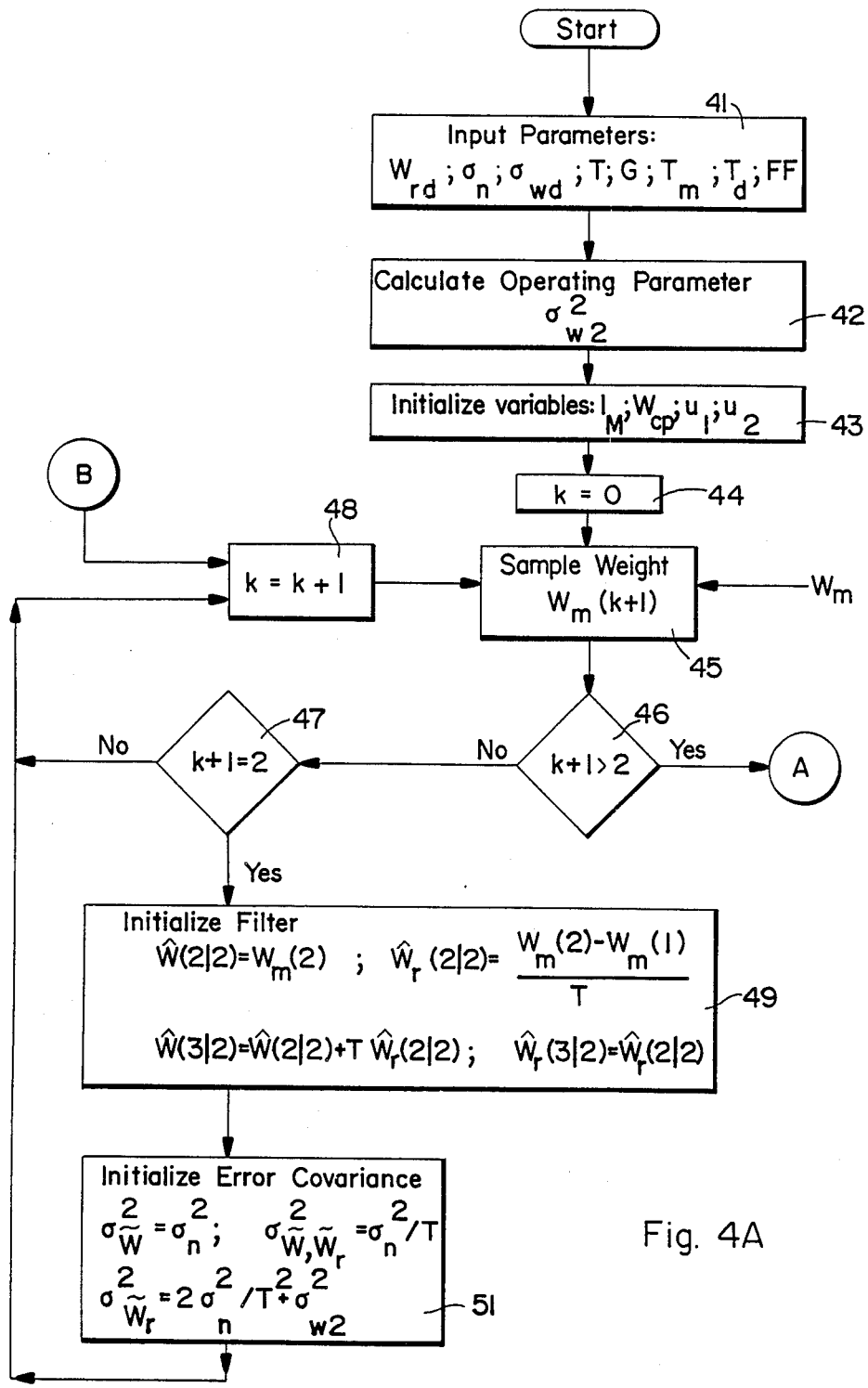
FIGS. 4A-4C are flowcharts of the computational steps performed by the weight signal processor of the present invention.
Figure 4B:
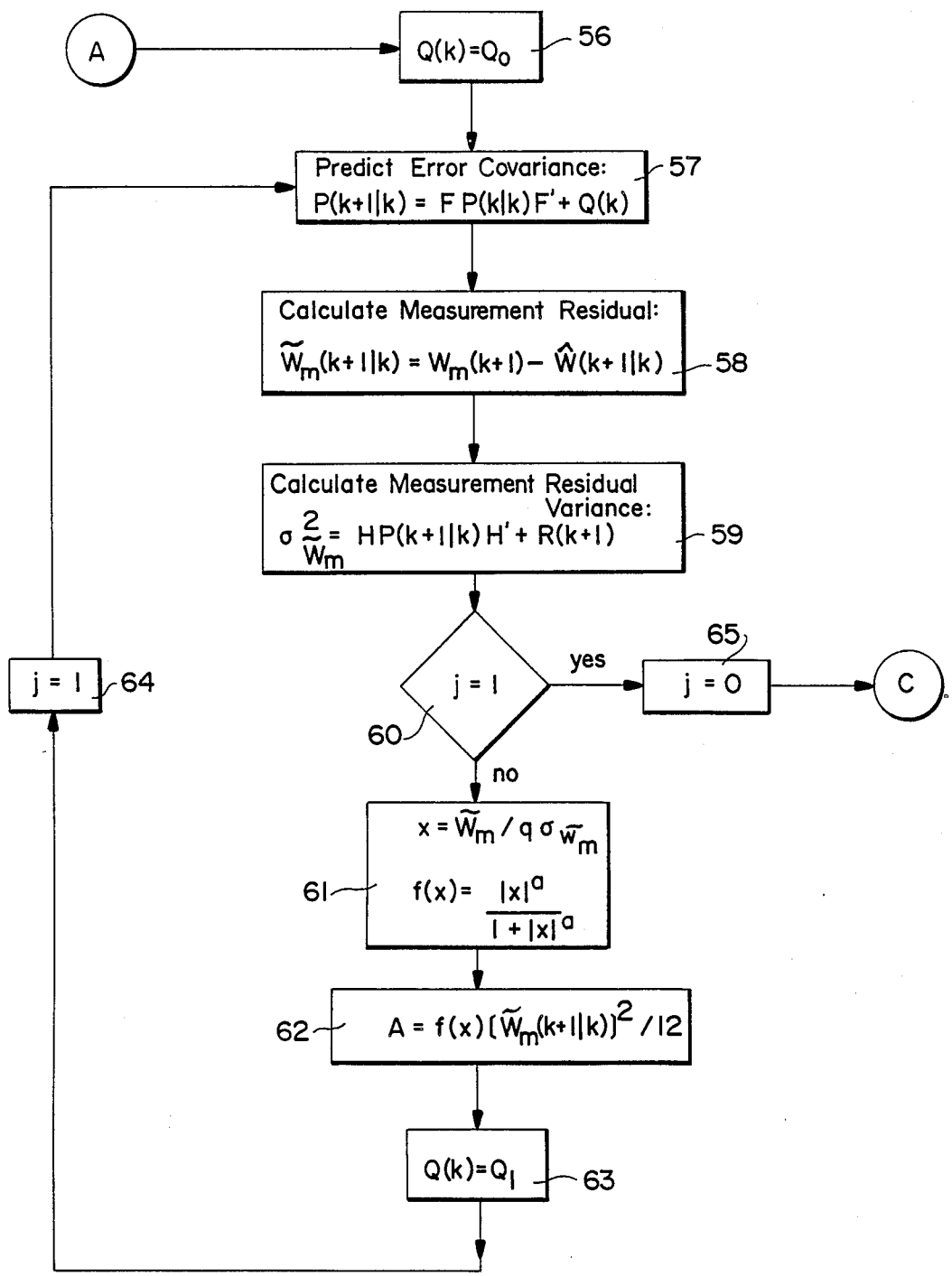
Figure 4C:
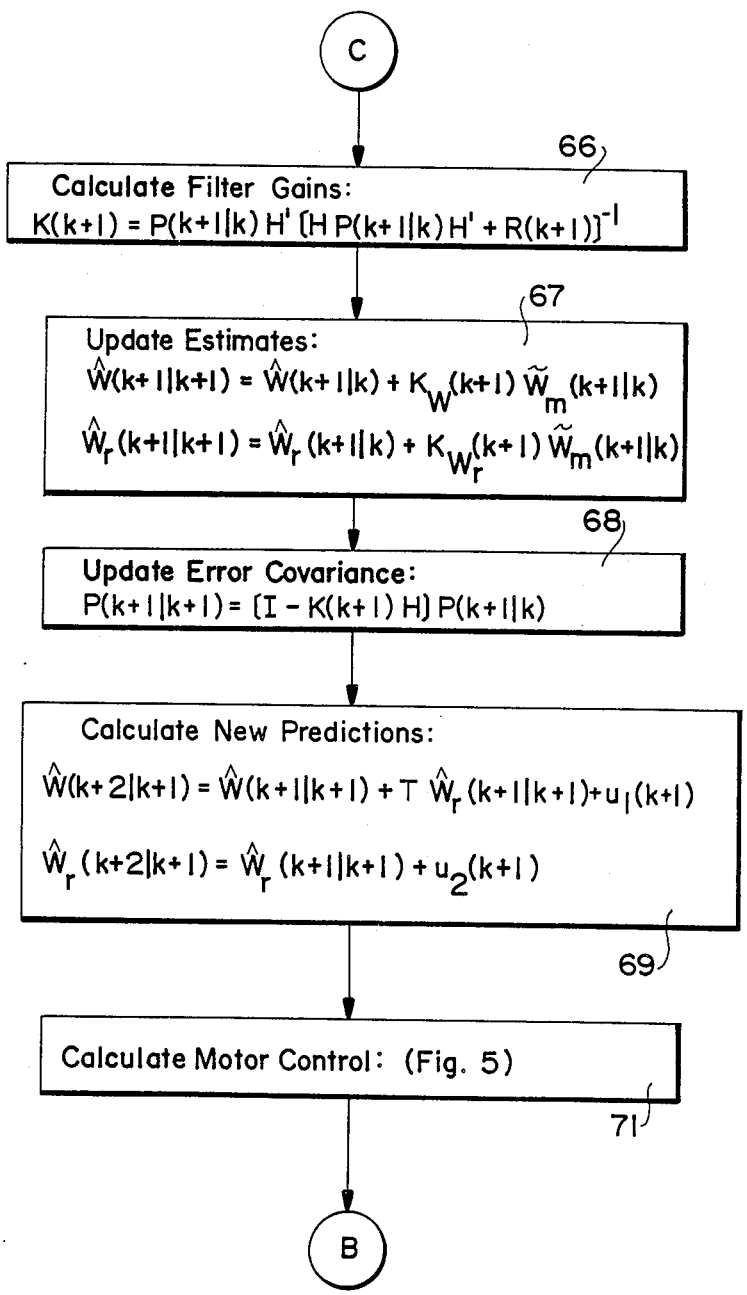

Referring to FIGS. 4A–4C, the process steps executed by signal processor 14 (FIG. 1) are shown. After the process is started, the following parameters are initialized in step 41.

$W_{rd}$—the desire mass flow set point;
$\sigma_n$—the standard deviation of measurement noise n;
$\sigma_{wd}$—the desired standard deviation of mass flow;
T—the weight signal ($W_m$) sampling period;
G—the gain constant of the motor controller;
$\sigma_m$—the time constant of the screw motor;
$T_d$—the communication delay associated with the feed screw motor; and
FF—the feed factor of the feed screw motor.

In Step 42, the variance, $\sigma_{w2}^2$, is calculated from the desired standard deviation of mass flow, $\sigma_{wd}$. This is an iterative calculation based on the known steady state relationship between the desired mass flow error variance ($\sigma_{wr}^2 = \sigma_{wd}^2$) and the parameters T, $\sigma_n^2$ and $\sigma_{w2}^2$. The iterative calculation is shown in the routine spanning lines 4999–5220 of the source code listing submitted herewith. In step 43 the following variables are all initially set to 0:

$W_{cp}$—weight control signal;
$u_1, u_2$—motor controls affecting weight and mass flow, respectively.

Also in step 43, feed screw motor signal, $I_M$, is initialized at a desired level so that the motor is initially moving at a desired speed. In the alternative, signal $I_M$ may be initialized to 0 so that the motor is initially stationary.

In step 44, counter k is set to 0, and control is transferred to step 45 where the first weight sample $W_m(1)$ is taken. Control is then transferred to decision block 46 where, if k+1 is greater than 2, indicating that the filter has already been initialized, control is transferred to the process steps of FIG. 4B. Otherwise, control is transferred to decision block 47 where, if k+1 is not equal to 2, control is transferred to block 48 and counter k is incremented. Another weight sample is then taken in block 45. If decision block 47 decides that k+1 is equal to 2, control is transferred to block 49 where filter initialization is begun.

In block 49, the initial weight state estimate, $\hat{W}$, is set to the measured weight at time k=2. In addition, the initial mass flow state estimate, $\hat{W}_r$, is set to the difference between the first two weight measurements divided by sampling period T. Thus, the initial estimates for weight and mass flow states are found using the last weight signal and its simple time derivative. Also in block 49, the predicted estimate of weight state at time k=3 is set to the estimated weight state at time k=2 plus T times the estimated mass flow state at a time k=2, and the predicted estimate of mass flow state at time k=3 is set to the estimated mass flow state at time k=2.

After the estimates and predictions of weight and mass flow states are initialized in block 49, control is transferred to block 51 where the four entries of the error covariance matrix P are initialized.

The error covariance matrix P takes the form:

$$P = \begin{bmatrix} \sigma_{\tilde{W}}^2 & \sigma_{\tilde{W}, \tilde{W}_r}^2 \\ \sigma_{\tilde{W}, \tilde{W}_r}^2 & \sigma_{\tilde{W}_r}^2 \end{bmatrix}$$

where:
$\sigma_{\tilde{W}}^2$ is the variance of the weight error;
$\sigma_{\tilde{W}_r}^2$ is the variance of the mass flow error; and
$\sigma_{\tilde{W}, \tilde{W}_r}^2$ is the covariance of the weight and mass flow errors.

After error covariance matrix P is initialized in block 51, control is transferred to block 48 where counter k is incremented and another weight sample is taken in block 45. Once the filter is initialized, k+1 will be greater than 2 and decision block 46 will transfer control to block 56 of FIG. 4B.

In block 56, plant noise covariance matrix Q(k) is set to $Q_0$ and control is transferred to block 57 where error covariance matrix P is updated using the matrix equation:

$$P(k+1|k) = FP(k|k)F' + Q(k)$$

where:
P(k+1|k) is the prediction of error covariance matrix P at time k+1 given measurements up to and including time k;
P(k|k) is the error covariance matrix P at time k given measurements up to and including time k;

$$F = \begin{bmatrix} 1 & T \\ 0 & 1 \end{bmatrix};$$

F' is the transpose of F; and
Q(k) is the plant noise covariance matrix at time k.

It should be noted that the diagonal elements of the P matrix ($\sigma_{\tilde{W}}^2$ and $\sigma_{\tilde{W}_r}^2$) are a measure of the performance of the estimation process. Although theoretically impossible, if the variance of the weight error $\sigma_{\tilde{W}}^2$ and the variance of the mass flow error, $\sigma_{\tilde{W}_r}^2$, are both zero, the estimates are perfect, i.e., the same as the real states. As a practical matter, only minimization of these error variances is realizable.

Control is then transferred to block 58 where the measurement residual is calculated using the equation:

$$\tilde{W}_m(k+1|k) = W_m(k+1) - \hat{W}(k+1|k)$$

where:
$\tilde{W}_m(k+1|k)$ is the measurement residual at time k+1 given measurements up to and including time k;
$W_m(k+1)$ is the weight measurement at time k+1; and
$\hat{W}(k+1|k)$ is the estimated weight state at time k+1 given measurements up to and including time k.

Control is then transferred to block 59 where the measurement residual variance is calculated using the matrix equation:

$$\sigma^2 \tilde{W}_m = HP(k+1|k)H' + R(k+1)$$

where:

H = [1 0];

H' is the transpose of H;

P(k+1|k) is calculated in block 57; and

R(k+1) is the measurement noise variance at time k+1 (actually $\sigma^2 n$).

Control then passes to decision block 60 where flag j is tested to decide if, during the present cycle, variance A has already been calculated by traversing the loop shown in FIG. 4B. If variance A has not yet been calculated this cycle, control is transferred to block 61 where variable x is set to the measurement residual $\tilde{W}_m(k+1|k)$ divided by a constant q and the standard deviation of the measurement residual (the square root of the variance calculated in block 59). Constant q is preferably in the range of $3 \leq q \leq 5$, however, values outside of this range are acceptable without departing from the scope of the invention.

An adaptive distribution function f(x) is also calculated in block 61 by the equation:

$$f(x) = |x|^a / (1 + |x|^a)$$

where:

$2 \leq a \leq 4$

Values outside of this range are acceptable without departing from the scope of the invention. The exact values of q and a depend upon the particular weigh feeder used and are determined experimentally in order to minimize the various elements of the error covariance matrix P during normal operation, and to minimize the deleterious effects of aperiodic hopper disturbance (such as refill).

f(x) represents the probability that the cause of the present measurement residual is a source outside of that indicated by the previous error covariance matrix P(k+1|k) (calculated in block 57), and due to measurement noise n(k) and mass flow noise $w_2(k)$.

Control then passes to block 62 where variance A is calculated as the product of the adaptive distribution function, f(x), multiplied by the square of the measurement residual divided by 12. This results in a uniform distribution for A.

Control then passes to block 63 where matrix Q(k) is set equal to $Q_1$, and flag j is set equal to 1 in block 64 before returning control to block 57.

Then, using the new value for Q(k), the error covariance matrix is recalculated in block 57, the measurement residual is recalculated in block 58 and the measurement residual variance is recalculated in block 59. Next, since flag j is now 1, control passes from block 60 to block 65 where counter j is reset to 0. Control is then transferred to block 66 of FIG. 4C.

Referring to FIG. 4C, the filter gains K are calculated in block 66 using the matrix equation:

$$K(k+1) = P(k+1|k)H'[HP(k+1|k)H' + R(k+1)]^{-1}$$

where:

$$K(k+1) = \begin{bmatrix} K_w(k+1) \\ K_{wr}(k+1) \end{bmatrix};$$

$K_w(k+1)$ is the weight Kalman gain at time k+1;

$K_{wr}(k+1)$ is the mass flow Kalman gain at time k+1; and all other variables have been previously defined or calculated.

The predicted weight state $\hat{W}$ and predicted mass flow state $\hat{W}_r$, at time k+1 given measurements up to and including time k+1, are then calculated in block 67 using the equations:

$$\hat{W}(k+1|k+1) = \hat{W}(k+1|k) + K_w(k+1)\tilde{W}_m(k+1|k)$$

$$\hat{W}_r(k+1|k+1) = \hat{W}_r(k+1|k) + K_{wr}(k+1)\tilde{W}_m(k+1|k)$$

where all variables have been previously defined and calculated.

Control is then transferred to block 68 where error covariance matrix P is updated. The matrix I appearing in the equation in block 68 is the identity matrix. All other variables have been previously defined and calculated.

Control is then transferred to block 69 where new predictions for estimated weight state $\hat{W}$ and mass flow state $\hat{W}_r$ are calculated for time k+2 given measurements up to and including time k+1, using the following equations:

$$\hat{W}(k+2|k+1) = \hat{W}(k+1|k+1) + T\hat{W}_r(k+1|k+1) + u_1(k+1)$$

$$\hat{W}_r(k+2|k+1) = \hat{W}_r(k+1|k+1) + u_2(k+1)$$

where:

$u_1(k+1)$ is the value of the motor control applied at time k+1 which is predicted to affect the weight state at time k+2;

$u_2(k+1)$ is the value of the motor control applied at time k+1 which is predicted to affect the mass flow state at time k+2; and where all other variables have been previously defined and calculated.

Control is then transferred to block 71 where the motor control is updated. The details of the processing steps performed within block 71 are shown in FIG. 5.

Upon exiting block 71, control is returned to block 48 (FIG. 4A) where counter k is incremented and the entire loop is retraced. It should be noted that, since the time necessary to traverse the loop may vary slightly from cycle to cycle, sampling period T is changed slightly from period to period. In the preferred embodiment, T is in the range of $0.75 \leq T \leq 2.0$ seconds although time periods outside of this range also produce acceptable results. Recalculation of T each cycle is illustrated in FIG. 6F.

Figure 5:
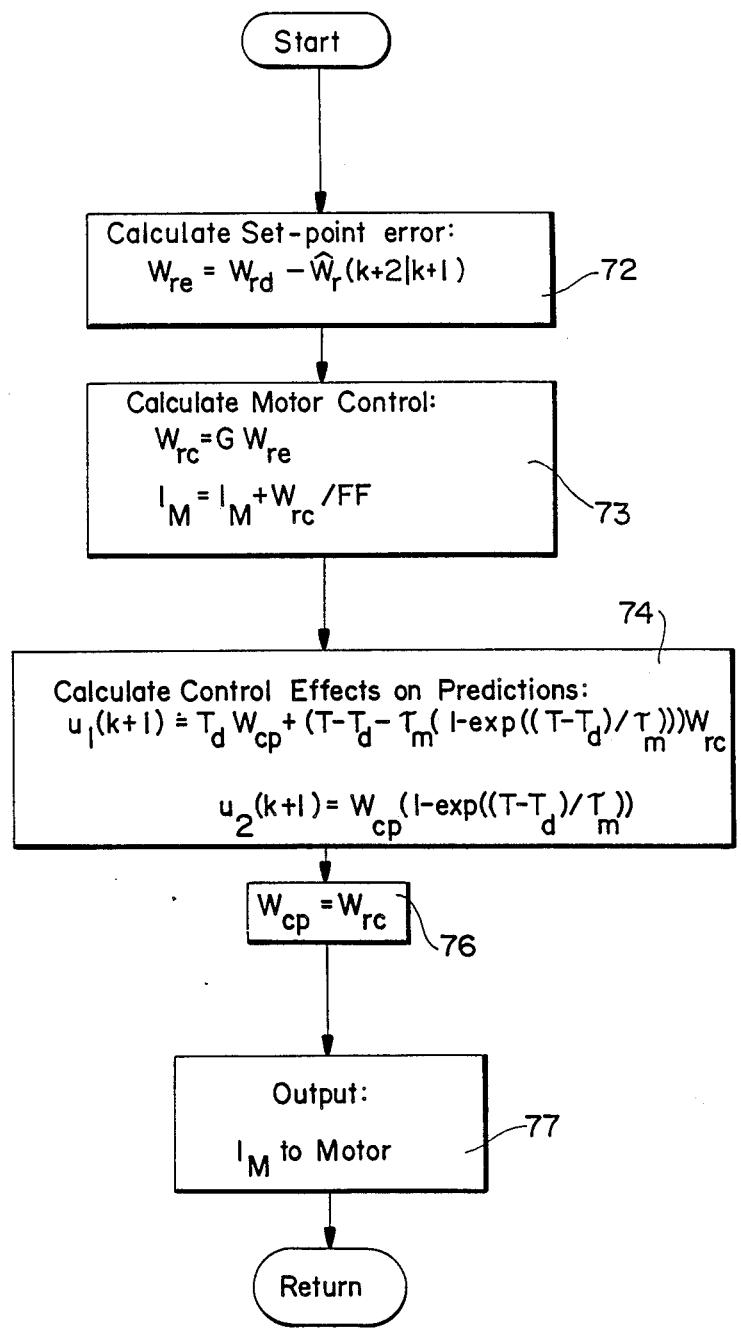
FIG. 5 is a flow chart of the computational steps performed by the motor controller of the present invention.

Referring to FIG. 5, in block 72, mass flow error signal, $W_{re}$, is calculated as the difference between desired mass flow set point, $W_{rd}$, and the mass flow state estimate, $\hat{W}_r$, previously calculated in block 69 of FIG. 4C. Control is then transferred to block 73 where weight rate control signal, $W_{rc}$, is calculated as the product of gain, G, and mass flow error, $W_{re}$. Motor signal $I_M$ is then adjusted by weight rate control signal, W_rc, divided by feed factor FF. Feed factor FF is used to convert the mass flow state variable to the motor speed signal in order to compensate for the nonlinear relationship between motor signal $I_M$ and motor speed.

Control is then transferred to block 74 where motor controls, $u_1$ and $u_2$, are calculated. These calculations represent a model of the control portion of the material discharge system. This is to be distinguished from the model of the estimation or filtering shown in FIG. 3 and in the process steps of FIGS. 4A-4C.

In block 76, past weight control signal, $W_{cp}$, is set equal to the weight control signal just calculated, $W_{rc}$.

In step 77, calculated motor signal, $I_M$, is output to a motor controller to control the rate of the material discharge.

It should be emphasized that the Kalman filter process of the present invention is a recursive process which requires very little information be stored and carried over from one calculation time interval to the next. Therefore, the present invention can be readily adapted for use in existing material discharge systems by reprogramming microprocessor program memories, and by using preexisting random access memories.

FIGS. 6A-6F graphically illustrate the operation of an actual weigh feeding system under closed-loop computer control.

The system was started at cycle 0 with the following initial parameters: T=1.3; $W_{rd}$=500; FF=0.3; q=3; and a=2. The system was started and run for approximately 100 calculation cycles while feeding semolina. Both natural plant and measurement noise were present. In addition, the system hopper was subjected to the following deliberate outside perturbations:

| Approximate Cycle Time | Perturbation |
| --- | --- |
| 25 | 17 mm wrench on |
| 35 | 17 mm wrench off |
| 55 | 3 Kg weight on |
| 65 | 3 Kg weight off |
| 90 | Material refill |

The ordinate in graphs 6A-6C is in parts per million where one million parts is equal to approximately 150 Kg (the maximum measureable weight of the weight sensor used). In other words, a reading of 600,000 parts per million equals 60% of 150 Kg, or 90 Kg.

Figure 6A:
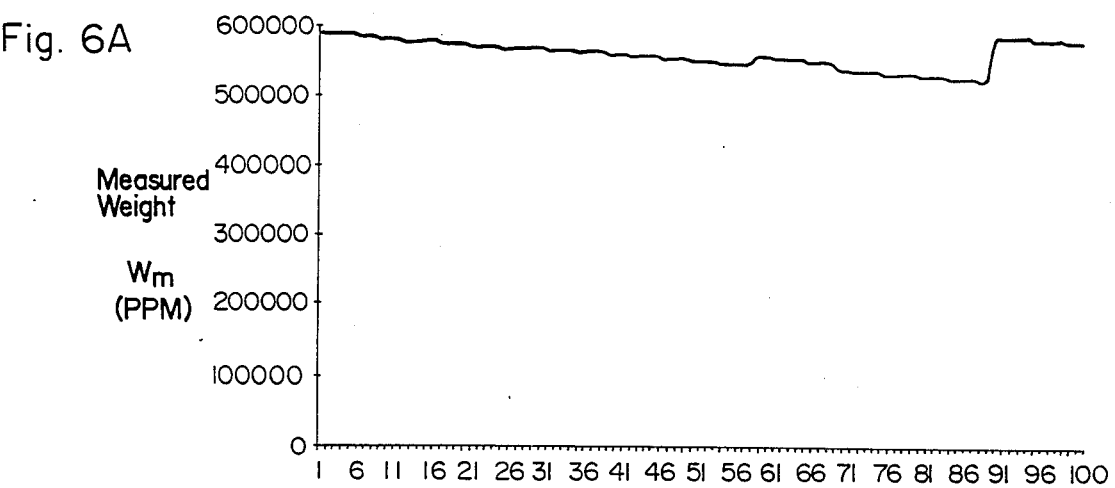
FIGS. 6A-6F are graphs of the operation of a weight feeding system according to the present invention.
Figure 6B:
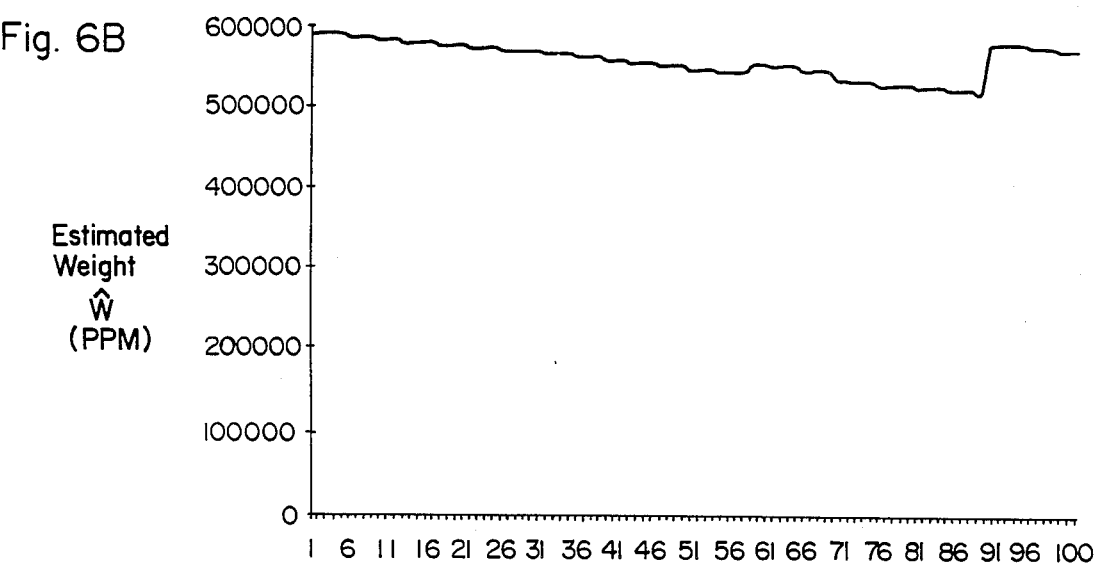
Figure 6C:
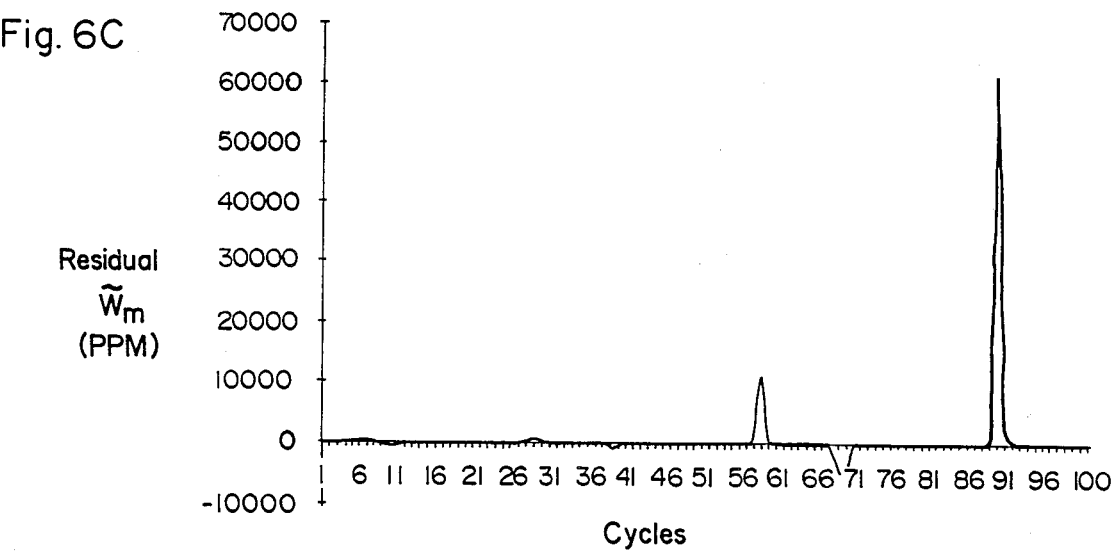
Figure 6D:
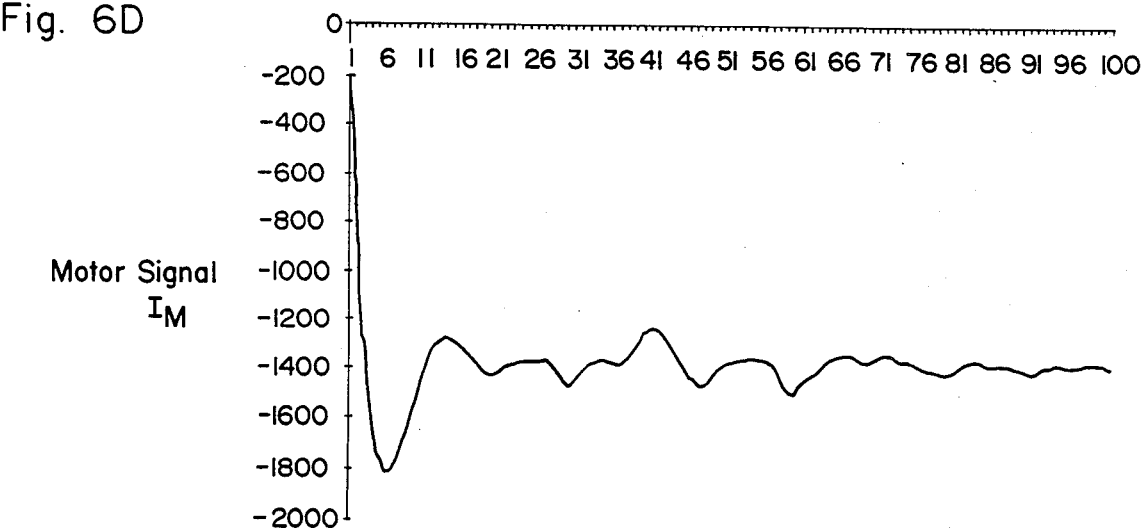

In FIG. 6D, the units of motor signal $I_M$ are directly convertable to a motor drive signal, for example, a frequency. The units of mass flow estimate in FIG. 6E are in parts per million per unit time and are directly convertable to Kg/sec.

FIG. 6F illustrates the variability of sample period T from one cycle to the next.

Figure 6E:
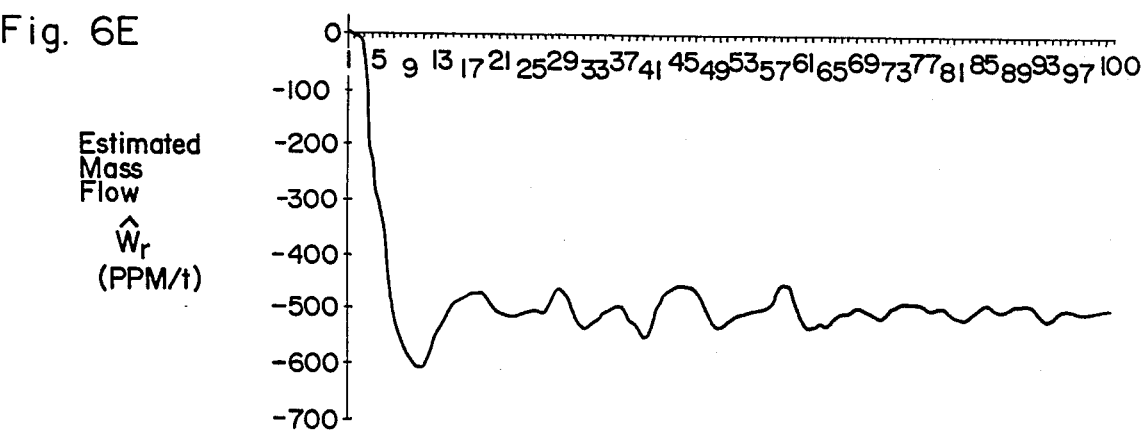
Figure 6F:
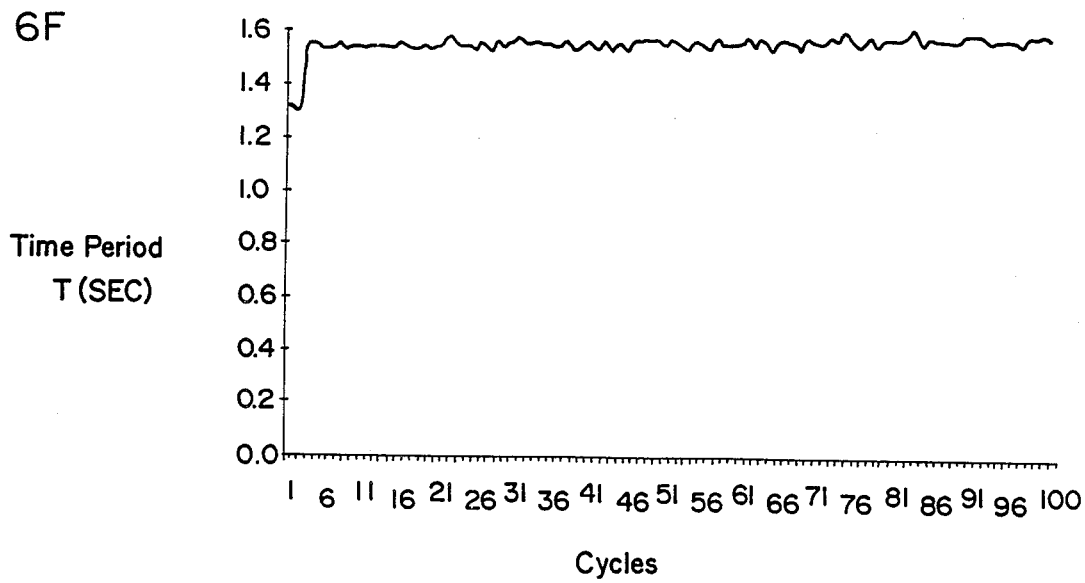

FIG. 7 is a tabular presentation of the graphs of FIGS. 6D and 6E.

Figure 8:
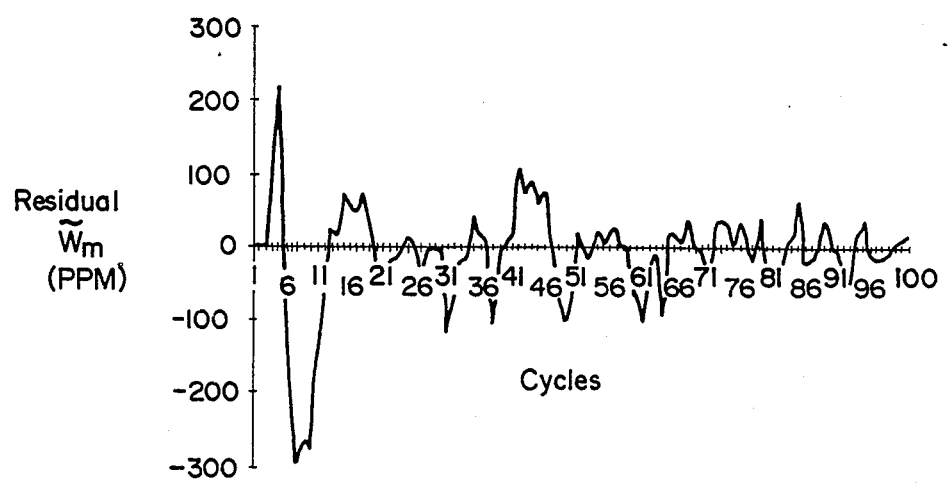
FIG. 8 is another graph of the operation of a weigh feeding system according to the present invention.

FIG. 8 is a graphical display of the same system as that operated to produce the graphs of FIGS. 6A-6F, showing operation with only the natural plant and measurement noise processes present without any outside perturbations.

The following is a commented source code listing of a computer program for computer 15 of the preferred embodiment. This program incorporates the steps shown in the flowcharts of FIGS. 4A-4C and 5.

```
2   'KALMAN FILTER FOR LOSS-IN-WEIGHT FEEDER
3   'L = CONVERSION WINDOW LENGTH
4   'I = MOTOR DRIVE COMMAND AS I= HZ.
5   'WT = WEIGHT COUNT ; WERR = WEIGHT ERROR INDICATOR
6   'TS = TIME STAMP ; DTS = MEASURED SAMPLE TIME
7   'MP = MOTOR POSITION
9   'SP = SET POINT
13  'FSC = FULL SCALE CAPACITY
14  'OPEN COMMUNICATIONS WITH THE OUTSIDE WORLD
15  'OPEN COMMUNICATIONS FILE#1 (128 BYTES) FOR ACA-1 AT 9600 BAUD,
16  'ODD PARITY, 8 DATA BITS, ONE STOP BIT, NO 'CLEAR TO SEND',
17  'NO 'DATA SET READY', PARITY CHECKING DISABLED.
18  '
20  CLS: PRINT "KALMAN FILTER ALGORITHM"
21  OPEN "COM1:9600,N,8,1,CS,DS" AS#1
23  'NOW BUILD THE DATA STATEMENTS WE'LL BE USING
24  GOSUB 2770    'ENTRANCE POINT FOR INITIALIZATION ONLY. LOOP USES 2800
25  GOSUB 2890    'INITIALIZE ANALYZER
26  GOSUB 2750    'WRITES A RESET TO THE I/O BOARD VIA THE PORT
27  GOSUB 2640    'BUILDS A SETF#
40  CGAIN = .5: CTIMEX = 25: NSIG = 50: VDSIG = 25: T = 1.3: VDESIRE = -1500
41  F$ = "TEMP":FF=.3: T=1.35:CFLAG=0  'FF=FEED FACTOR (VELOCITY/M.SPEED COMMAND)
AND T=APPROX SAMPLE TIME
42  FSC = 60              'FULL SCALE CAPACITY IN KG
50  PRINT " "
55  INPUT " ENTER CGAIN... THE DEFAULT VALUE IS 0.5";I
60  IF I = 0 THEN 88
65  IF (I ) 0) AND (I ( 1!) THEN 80
70  PRINT "UNACCEPTABLE ENTRY FOR CGAIN. USE VALUE BETWEEN 0 AND 1":BEEP
75  GOTO 50
80  CGAIN = I
88  PRINT
90  PRINT " THE KALMAN FILTER IS ACTIVATED AFTER 10 SAMPLES"
95  INPUT "ENTER THE LOOP COUNT WHERE MOTOR CONTROL STARTS, DEFALUT = 25";I
97  INPUT "ENTER CONTROL TIME DELAY(TDELAY) ";TDELAY
98  INPUT "ENTER MOTOR ACTIVATION DELAY (TAU) ";TAU
100 IF I<>0 THEN CTIMEX=I
```

```
105 QFAC=3 : AFAC=2
110 PRINT " ":INPUT "INPUT WEIGHT NOISE S.D., DEFALULT = 50";I
120 IF I <> 0 THEN NSIG = I
130 PRINT " ":INPUT "INPUT VELOCITY DESIRED S.D., DEFAULT = 25";I
140 IF I <> 0 THEN VDSIG = I
160 PRINT
165 I=0!:INPUT "ENTER STARTING MOTOR SPEED (DMT WC/SEC) (DEFAULT=0)" ;ITEMP
171 IF ITEMP<>0 THEN I=ABS(ITEMP)
172 STARTI% = -INT(I)
175 I = -ABS(I/FF) 'MAKE SURE IT IS NEG.
177 PRINT :INPUT "ENTER THE OUTPUT DATA FILE NAME, DEFAULT = 'TEMP'";A$
178 IF A$ <> "" THEN F$ = A$
180 CLS
181 PRINT "********************* RUN PARAMETERS **********************"
182 PRINT
185 PRINT " CGAIN"," NSIG"," VDSIG"," CTIME"," STARTI        F$"
190 PRINT CGAIN,NSIG,VDSIG,CTIME%,STARTI%
191 LOCATE 4,69
192 PRINT F$
195 '
200 LOCATE 7,1
210 PRINT "********************* SYSTEM STATUS ***********************"
220 PRINT:PRINT " COUNT","SETPOINT","T.STAMP","DMT W.CNTS","M.SPEED"
230 LOCATE 13,1
240 PRINT "********************* FILTER CHARACTERISTICS **************"
250 PRINT:PRINT " W.C.PRED","FLOWRATE","GAIN 1        GAIN 2        DEL T"
251 LOCATE 15,68:PRINT "PERTURBATION"
260 LOCATE 19,1
270 PRINT "** OPTIONS **   ENTER 'S' TO CHANGE SETPT., ENTER 'H' TO HALT"
329 GOSUB 5020
330 OPEN "C:"+F$ AS #2 LEN=59
332 FIELD #2, 7 AS FT$, 7 AS FX$, 9 AS FXH$, 7 AS FV$, 5 AS FK1$, 5 AS FK2$,5 AS
 FI$,7 AS FMS$,7 AS FZRES$
340 GOSUB 2520      'SENDS A WINDOW LENGTH COMMAND
350 GOSUB 2640
360 GOSUB 2560 'SEND "START READ WEIGHT" COMMAND
458 '-------------------BEGINNING OF LOOP-----------------------------
460 FOR LUP%=1 TO 1070
540 A$=INKEY$:IF A$=""THEN 940
560 IF (A$="S") OR (A$ = "s") THEN 700
565 IF (A$="H") OR (A$ = "h") THEN 988
570 GOTO 940
700 SCONT%=1:TDADD=TIMER:LOCATE 23,1
710 INPUT"ENTER NEW SETPOINT. THE UNITS ARE (DMT WEIGHT COUNTS)/SEC";SP
715 VDESIRE=-ABS(SP) 'I=VELOCITY OR FLOW RATE
717 TDADD=TIMER-TDADD
940 TO=TIMER
950 PRINT #1, RED$    'SEND A "READ AND START WEIGHT" COMMAND
953 GOSUB 2220            'DO MATH
955 GOSUB 2320
957 GOSUB 3000
958 Z=WT:IF LUP%=CTIME% THEN CFLAG=1
960 IF LUP%=8 THEN ZPAST=WT
965 IF LUP%=9 THEN GOSUB 6340 'INITIAL FILTER (N=0)
968 IF LUP%>9 THEN GOSUB 6010 'KALMAN FILTER
975 IF I = SAVEDI THEN 982      'I IS MOTOR DRIVE COMMAND FREQUENCY
977 SAVEDI=I:GOSUB 2640    'REBUILD A NEW MOTOR SPEED COMMAND AND SEND IT
980 'DELAY 1/2 SECOND INCLUDING PROGRAM EXECUTION TIME
982 TO=.022*L+.043 + TO
983 LSET FT$=STR$(TS):LSET FX$=STR$(WT):LSET FXH$=STR$(XHAT):LSET FV$=STR$(VHAT)
:LSET FK1$=STR$(K1):LSET FK2$=STR$(INT(K2*1000!)/1000):LSET FI$=STR$(INT(I)):LSE
T FMS$=STR$(INT(ZCST*1000)/1000):LSET FZRES$=STR$(ZRES)
984 PUT #2,LUP%+1
985 IF TIMER<TO THEN 985
986 NEXT
988 LSET FT$=STR$(LUP%-1)
990 PUT #2,1:CLOSE #2
995 I=0:GOSUB 2640:STOP
1000 '-------------------END OF LOOP---------------------------------
2210 ' DELAY FOR ABOUT 0.1 SEC
2220 TX=TIMER + .12
2230 IF TIMER <TX THEN 2230
2240 RX$=""
2250 WHILE NOT EOF(1)
```

```
2260 I$=INPUT$(LOC(1),#1)
2270 WEND
2280 RX$=I$
2300 RETURN
2310 '*********************************************************
2320 W$=MID$(RX$,32,2)+MID$(RX$,37,2)+MID$(RX$,42,2)
2350 WT=VAL("&H"+MID$(W$,6,1))+VAL("&H"+MID$(W$,5,1))*16+VAL("&H"+MID$(W$,4,1))*
256+VAL("&H"+MID$(W$,3,1))*4096!+VAL("&H"+MID$(W$,2,1))*65536!
2351 WT=VAL("&H"+MID$(W$,1,1))*65536!*16! + WT
2358 WT=WT-TARE
2360 WERR=VAL("&H"+MID$(W$,1,1))AND 8
2370 IF WERR THEN 2372 ELSE 2400
2372 LOCATE 21,1:PRINT "WEIGHT ERROR @ ";LUP%
2400 T$=MID$(RX$,47,2)+MID$(RX$,52,2)+MID$(RX$,57,2)
2420 TS=(VAL("&H"+MID$(T$,6,1))+VAL("&H"+MID$(T$,5,1))*16+VAL("&H"+MID$(T$,4,1))
*256+VAL("&H"+MID$(T$,3,1))*4096+VAL("&H"+MID$(T$,2,1))*65536!+VAL("&H"+MID$(T$,
1,1))*1048576!)*1.953125E-05
2431 TD=TS-SAVEDTS : SAVEDTS=TS
2432 IF TD<0 THEN TD=TD+327.68
2450 M$=MID$(RX$,62,2)+MID$(RX$,67,2)
2460 OLDMP = MP
2470 MP=VAL("&H"+MID$(M$,4,1))+VAL("&H"+MID$(M$,3,1))*16+VAL("&H"+MID$(M$,2,1))*
256+VAL("&H"+MID$(M$,1,1))*4096
2472 DELMP = MP-OLDMP
2474 IF (DELMP (= 0) OR (TD (= 0) THEN 2480
2476 MSPEED = DELMP/TD
2480 RETURN
2520 '*********************************************************
2530 PRINT #1,LENG$
2540 GOSUB 2220
2550 RETURN
2560 PRINT #1,STT$
2570 GOSUB 2220
2580 RETURN
2600 PRINT #1,RED$
2610 GOSUB 2220
2620 RETURN
2625 '*********************************************************
2630 'BUILD A NEW MOTOR SPEED COMMAND AND SEND IT TO THE PORT
2640 ITEMP%=-INT(I)
2642 IF ITEMP%<0 THEN ITEMP%=0
2650 MJR$=HEX$(((ITEMP%\128)AND 127)OR 128)
2680 MNR$=HEX$((ITEMP% AND 127)OR 128)
2690 CHA$=HEX$(((ITEMP%\16384)AND 3)OR 12)
2700 SETF$="'83"+"0"+CHA$+MJR$+MNR$+CHR$(3)+CHR$(16)
2710 PRINT #1,SETF$
2715 GOSUB 2220
2720 RETURN
2730 '*********************************************************
2740 'WRITE A RESET COMMAND TO THE PORT
2750 PRINT #1,REST$
2755 GOSUB 2220
2760 RETURN
2762 '*********************************************************
2765 'ENTRANCE FOR INITIALIZATION ONLY!!
2770 L=48:SAVEDL=L:DELAY=.1
2775 TDADD=0:SCONT%=0:SCONT2%=0
2780 TARE=1000000!
2790 I=0!:SAVEDI=I
2800 ANASET$=CHR$(9)+CHR$(13)+CHR$(18)+"1"
2801 LDL$=HEX$(L)
2830 RED$="'8B"+"00"+CHR$(3)+CHR$(16)
2840 REST$="'87"+"00"+CHR$(3)+CHR$(16)
2850 LENG$="'86"+"01"+LDL$+CHR$(3)+CHR$(16)
2860 STT$="'86"+"00"+CHR$(3)+CHR$(16)
2870 RETURN
2880 '*********************************************************
2890 PRINT #1,ANASET$
2900 RETURN
3000 IF (CFLAG) THEN CURSTP=VDESIRE ELSE CURSTP=STARTI%
3010 LOCATE 10,1
3020 PRINT LUP%,CURSTP,TS,WT,MSPEED
3030 RETURN
3995 '************* PRINT DATA IN A FILE *************************
```

```
4000 INPUT"WHAT FILE NAME";F$
4005 OPEN "C:"+F$ AS #2 LEN=59
4010 FIELD #2, 7 AS FT$, 7 AS FX$, 9 AS FXH$, 7 AS FV$, 5 AS FK1$, 5 AS FK2$,5 A
S FI$,7 AS FMS$,7 AS FZRES$
4020 GET #2,1
4030 F1=VAL(FT$)
4035 LPRINT "FILE NAME IS ";F$,TIME$,DATE$
4037 LPRINT:LPRINT" #     TIME      X_MEAS      X_HAT      V_HAT      K1      K2      M.SP
D    M.POS    ZRES"
4040 FOR I=2 TO F1
4050 GET #2,I
4060 LPRINT (I-1);"   ";FT$;"   ";FX$;"   ";FXH$;"   ";FV$;"   ";FK1$;"   ";FK2$;"   ";FI$;
"   ";FMS$;"   ";FZRES$
4070 NEXT I
4080 CLOSE #2:STOP
4999 '******* COMPUTE DESIRED VELOCITY STANDARD DEVIATION ***********
5020 NSIG2=NSIG*NSIG
5040 VDSIG2=VDSIG*VDSIG
5050 AA=VDSIG2*T*T/NSIG2
5070 A=.5:AX=.5
5080 FOR K%=1 TO 30
5090   FX=A^3/((1!-A)*(2!-A))
5100   A=A-AX*(1!-AA/FX)/(3!/A+1!/(1!-A)+1!/(2!-A))
5110   IF A)1! THEN A=.9
5120   IF A(0! THEN A=.1
5130   B=A*A/(2!-A)
5150 NEXT
5160 VSIG2=NSIG2*B*B/(T*T*(1!-A))
5170 VSIG=SQR(VSIG2)
5220 RETURN
5900 QFAC=3
5910 AFAC=2
6000 '***************** KALMAN FILTER *************************
6010 IF SCONT2%=1 THEN TD=TD-TDADD:SCONT2%=0
6020 IF SCONT%=1 THEN TD=TD+TDADD:SCONT%=0:SCONT2%=1
6030 JF%=0
6040 PP11=P11+(2!*TD*P12)+(TD*TD*P22):PP12=P12+TD*P22:PP22=P22+VSIG2
6050 ZRES=Z-XHATPRED
6060 PPZ=PP11+NSIG2
6070 REM K1=PP11/(PP11+NSIG2):K2=PP12/(PP11+NSIG2)
6080 REM P11=(1!-K1)*PP11:P12=(1!-K1)*PP12:P22=PP22-(K2*PP12)
6090 ZCONST=0
6100 IF JF%=1 THEN 6180
6110 LOCATE 16,69:PRINT "## ";LUP%;" ##";MP=-ABS(MP)
6120 ZFAC=ABS(ZRES/(QFAC*PPZ^.5))
6130 ZCONST=ZFAC^AFAC/(1+ZFAC^AFAC)
6140 ZCST=ZCONST
6150 Q11=ZCONST*ZRES*ZRES/12!
6160 PP11=PP11+Q11:JF%=1:GOTO 6060
6170 ZRES=Z-XHATPRED
6180 JF%=0
6190 K1=PP11/(PP11+NSIG2):K2=PP12/(PP11+NSIG2)
6200 XHAT=XHATPRED+K1*ZRES
6210 VHAT=VHATPRED+K2*ZRES
6220 P11=(1!-K1)*PP11:P12=(1!-K1)*PP12:P22=PP22-(K2*PP12)
6230 TD1=TD-TDELAY:BB= 1!-EXP(-TD1/TAU)
6240 XHATPRED=XHAT+TD*VHAT+TDELAY*VCPAST+(TD1-TAU*BB)*VCTEMP:VHATPRED=VHAT+VCTEM
P*BB
6250 VCERROR=VDESIRE-VHATPRED:VCPAST=VCTEMP:ZPAST=Z
6260 VCTEMP=CGAIN*VCERROR*CFLAG
6270 I=I+VCTEMP/FF
6280 IF I)0! THEN I=0!:VCTEMP=0!
6290 LOCATE 16,1:PRINT USING "######.###   ";XHAT,VHAT,K1,K2,TD,ZRES
6300 LOCATE 17,1:PRINT USING "######.###   "; ZCST
6310 ZPAST=Z
6320 RETURN
6330 ' INITIAL FILTERING
6340 ZTHF%=0:P11=NSIG2:P22=(2!*NSIG2/(TD*TD))+VSIG2:P12=NSIG2/TD
6350 XHAT=Z:VHAT=(Z-ZPAST)/TD:ZPAST=Z:XHATPRED=XHAT+TD*VHAT:VHATPRED=VHAT
6360 VCERROR=VDESIRE-VHAT
6370 LOCATE 16,1
6380 PRINT USING "######.###   ";XHAT,VHAT,K1,K2,TD
6390 RETURN
```

I claim:

1. A method of weigh feeding material comprising the steps of:
   storing a quantity of material;
   discharging said material;
   sensing a weight of the stored material or the material being discharged;
   deriving an estimate of an actual weight state of said weighed material, and an estimate of an actual mass flow state of the material being discharged, from said sensed weight using a model of at least one noise process which causes said sensed weight to differ from the actual weight state;
   determining a difference between said estimate of said actual weight state and said sensed weight;
   modifying said noise process model based on a magnitude of said difference and a probability of occurrence of said magnitude of said difference; and
   controlling said discharge of material using said estimate of said actual mass flow state to maintain said actual mass flow state at a desired mass flow state.

2. A method as recited in claim 1 comprising the further step of repetitively deriving new estimates of the actual mass flow state in accordance with said deriving step using successively modified noise models obtained from repetitively performing said modifying step.

3. A method as recited in claim 2 wherein said at least one noise process model is stochastic and includes a model of at least one plant noise process and a model of at least one measurement noise process.

4. A method as recited in claim 3 wherein said modifying step includes the step of:
   modifying said plant noise process model.

5. A method for weigh feeding material including the steps of:
   storing a quantity of material in a container;
   discharging said material using controllable discharge means;
   sensing a weight of the stored material or the material being discharged;
   modeling at least one noise process that causes said sensed weight to differ from an actual weight state of said material to obtain a noise model;
   calculating an estimated weight state of said weighed material and an estimated mass flow state of the material being discharged using a Kalman filtering process based on said sensed weight and said noise process model;
   calculating a measurement residual from said estimated weight state and said sensed weight;
   calculating a standard deviation of said measurement residual;
   calculating a probability of occurrence of said measurement residual using said standard deviation;
   modifying said noise process model based on said measurement residual and said probability of occurrence of said measurement residual;
   controlling said discharging of material using said estimated mass flow state to maintain an actual mass flow state of the material being discharged substantially equal to a desired mass flow state; and
   repetitively calculating a new estimated mass flow state of the material being discharged in accordance with said calculating step for controlling said discharging of material using successively modified noise process models obtained from repetitively performing said modifying step.

6. A method according to claim 5 wherein said noise process model includes at least one plant noise process model including a variance parameter, and wherein said modifying step further includes the steps of:
   setting said variance parameter of said at least one plant noise process model proportional to a square of said measurement residual.

7. A method as recited in claim 5 wherein said discharge means actively displaces the material being discharged and said modeling step includes the steps of:
   operating said discharge means without discharging material;
   sensing a weight of at least said container; and
   calculating a variance of the sensed weight.

8. A weigh feeding system comprising:
   means for storing material;
   means for discharging material from said means for storing;
   means for sensing a weight of the stored material or a weight of the material being discharged;
   means for deriving an estimated weight state of the material being weighed and an estimated mass flow state of the material being discharged from said sensed weight using a noise model of at least one noise process which causes said sensed weight to differ from an actual weight state of the material being weighed;
   means for calculating a measurement residual equal to a difference between said sensed weight and said estimated weight state;
   means for modifying said noise model comprising:
      means for calculating a standard deviation of said measurement residual;
      means for calculating a distribution function based on a ratio of said measurement residual and said standard deviation;
      means for calculating a variance of said noise model based on said distribution function and said measurement residual; and
   means for controlling said means for discharging according to said estimated mass flow state to discharge material from said means for storing at a desired mass flow state.

9. A weigh feeding system as recited in claim 8 wherein said distribution function is calculated according to the equation:

$$f(x) = |x|^a/(1+|x|^q)$$

where:
   f(x) is the distribution function;
   $x = \tilde{W}_m/q\sigma\tilde{W}_m$;
   $\tilde{W}_m$ is the measurement residual
   $\sigma\tilde{W}_m$ is the standard deviation of the measurement residual;
   $3 \leq q \leq 5$; and
   $2 \leq a \leq 4$.

10. A weigh feeding system as recited in claim 9 wherein said variance of said noise model is calculated according to the equation:

$$A = f(x)\tilde{W}_m^2/12$$

where: A is the variance.